Feb. 25, 1964  D. J. DOMIZI  3,122,624
CURRENT CONCENTRATOR FOR HIGH-FREQUENCY SEAM WELDING
Filed Nov. 22, 1961
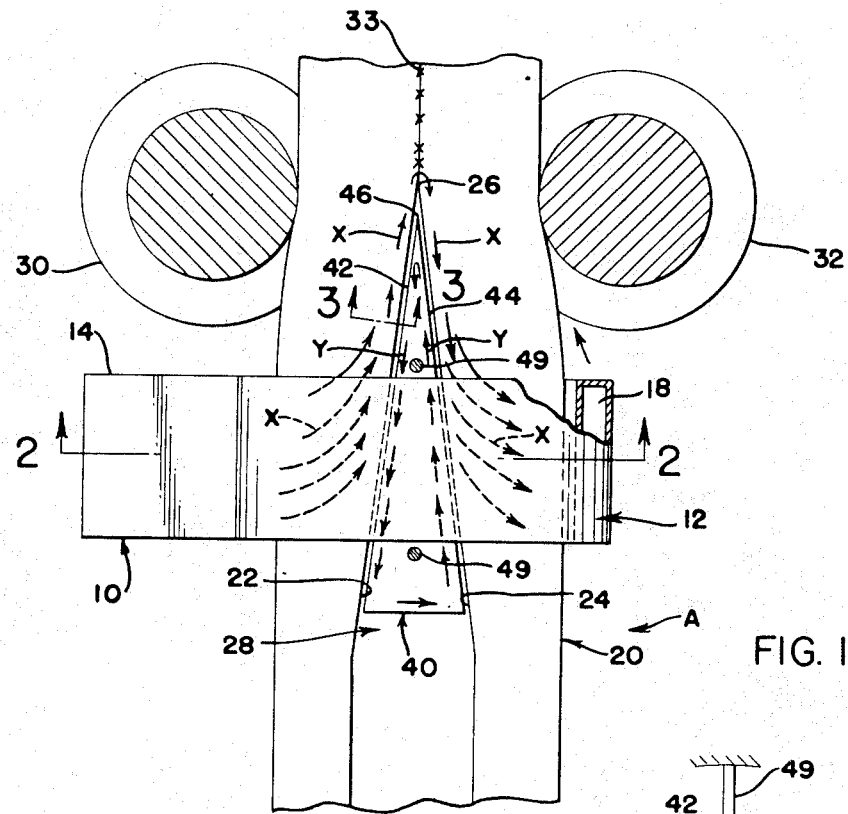
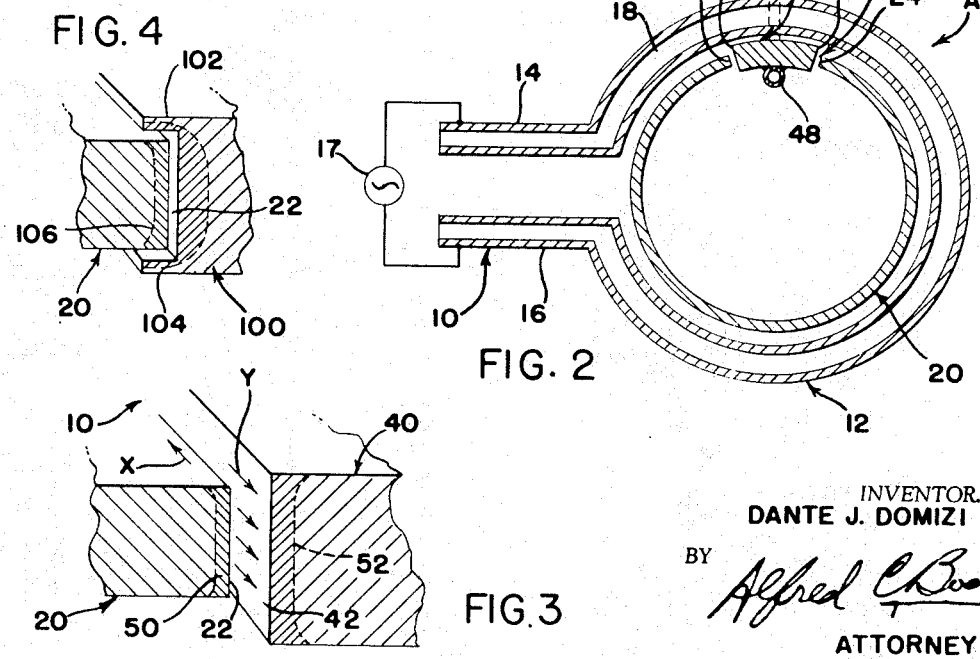
INVENTOR.
DANTE J. DOMIZI
BY Alfred C. Body
ATTORNEY

United States Patent Office 3,122,624
Patented Feb. 25, 1964

3,122,624
CURRENT CONCENTRATOR FOR HIGH-FREQUENCY SEAM WELDING
Dante J. Domizi, Parma, Ohio, assignor to The Ohio Crankshaft Company, Cleveland, Ohio, a corporation of Ohio
Filed Nov. 22, 1961, Ser. No. 154,148
8 Claims. (Cl. 219—8.5)

This invention pertains to the art of continuous high-frequency seam welding and more particularly to an apparatus for high-frequency welding of longitudinally split tubing or pipe having edges converging at a welding point.

The present invention is particularly applicable to high-frequency continuous welding of the normally spaced edges of longitudinally-split pipe and it will be discussed with particular reference thereto; however, it is to be appreciated that the invention has much broader applications and may be used in high-frequency continuous welding of split tubing or pipe wherein the high-frequency current across the welding point is conducted into the tubing or pipe by sliding brushes on either side of the longitudinally extending split. The term "welding point" as used in the seam welding art and as used herein refers to the engagement point between the converging edges of the tubing which point is to be heated by the high-frequency current in the tubing.

It has become common practice to continuously seam weld longitudinally split pipe by bringing the spaced edges of the split together and inducing a high-frequency current along the edges before they are brought together and across the welding point. Heat generated by the flow of current along the edges preheats these edges and the current across the engaging edges further raises the temperature of the edges so they may be welded together. Continuously seam welding pipe in this manner is usually accomplished by an encircling inductor forward of the welding point and a plurality of pressure rolls adjacent or beyond the welding point. The encircling inductor induces a high-frequency current within the pipe which current passes along the edge of the split and across the welding point to weld the preheated edges together. In such an induction welding apparatus it is essential to obtain a high current density in the edges to raise the temperature of the converging edges to the butt welding temperature. The high-frequency of the current causes the current to travel along a low impedance path near the edges and across the point of engagement of these edges; however, the current still tends to flow in a wide path along the edges and across the portion of the pipe already welded together which substantially decreases the current density along converged edges and across the welding point, i.e., the small portion of the edges that are in engagement but not yet welded.

Many structural modifications in the inductor of the seam welding apparatus have been considered to increase the current density along the edges and/or across the welding point; and these modifications have ranged from high electrical conductivity bars or segments extending axially above the longitudinal split to contoured inductors. These various attempts to increase the current density along the converging edges and across the non-welded, but engaged, edges have resulted in a substantial improvement of the current density at the edges and the welding point; however, these modifications are bulky and cannot be used in some applications wherein there is limited space adjacent the inductor, or they add substantially to the cost of the inductor, and/or they do not give a uniform heating pattern throughout the complete thickness of the pipe especially when the pipe has a greater wall thickness.

The present invention contemplates new and improved means for causing all or a very much larger percentage of the induced current in the pipe to flow along the edges and across the edges as they are brought into abutting engagement rather than to flow in other parts of the pipe such as the sides spaced from the edges and the already welded seam portion, and at the same time, increase the amount of current flowing along the edges and across the welding point.

In accordance with the present invention, there is provided a seam welding apparatus for continuously welding the spaced edges of a longitudinally split pipe comprising means for advancing the pipe along a predetermined path, means for moving the edges into abutting engagement at a predetermined welding point in the path, means in advance of the welding point for causing a flow of high-frequency current along the edges of the pipe and across the welding point and a highly conductive non-magnetic means in the split and closely spaced from the edges and the welding point for concentrating the welding current along the edges of the pipe and across the welding point.

In accordance with another aspect of the present invention, a pipe encircling induction heating coil adapted to continuously seam weld split pipe having two longitudinal edges converging at a welding point is provided with a highly conductive non-magnetic means extending into the split between the edges and closely spaced from the edges and the welding point for concentrating the welding current along and adjacent to the edges of the pipe and across the welding point.

The principal object of the invention is the provision, in combination with pipe seam welding equipment of the type referred to, of new and improved means for concentrating the principal portion of the induced current at the point of initial engagement of the edges to be welded, which means is simple in construction, electrically efficient and inexpensive to manufacture.

Another object of the invention is the provision of new and improved means for lowering the impedance of the edges between the exit end of the inductor and the point where the edges are brought together comprising a member of high electrical conductivity in magnetically close-coupled relationship with the edges.

Still a further object of the invention is the provision of new and improved means for increasing the current flowing along the longitudinal edges of the pipe and across the point where the edges meet.

Another object of the invention is the provision of a high electrical conductive insert for use with an inductor of a continuous seam welding apparatus of the type used in high-frequency welding of pipe having normally spaced longitudinal edges which increases the current density at the welding point and which does not substantially increase the size or complexity of the inductor.

Yet another object of the invention is the provision of a means for concentrating the current at the welding point of a continuous seam welding apparatus of the type used in high-frequency welding of pipe having a means for inducing a high-frequency current into the pipe so that a greater proportion of the current flows along the edges and across the welding point.

Another object of the present invention is to provide a means for concentrating current at the welding point of a continuous seam welding apparatus of the type used in high-frequency welding of pipe having a means of inducing a high-frequency current into the pipe so that a greater proportion of the current flows along the edges and across the welding point.

Still another object of the present invention is to provide such a means which extends into the split created by the normally spaced edges of the pipe to cause current flow throughout the entire thickness of the pipe.

The term "pipe" refers to a tubular structure having a relatively thick outer wall.

These and other objects and advantages will become apparent from the following description used to illustrate the preferred embodiment of the present invention as read in connection with the accompanying drawing in which:

FIG. 1 is a top view illustrating the preferred embodiment of the present invention;

FIG. 2 is a cross sectional view taken along line 2—2 of FIG. 1;

FIG. 3 is a partial enlarged view taken along the line 3—3 of FIG. 1; and

FIG. 4 is a partial enlarged view similar to FIG. 3, but illustrating a modification of the preferred embodiment.

Referring now to the drawings, wherein the showings are for the purpose of illustrating a preferred embodiment of the invention and not for limiting same, FIG. 1 shows a welding apparatus A for continuously seam welding a split pipe having longitudinally extending normally spaced edges. The apparatus includes an inductor 10 which, in the preferred embodiment, takes the form of a single turn inductor having a C-shaped body or conductor 12 and radially extending spaced fishtail leads 14, 16 electrically connected to an appropriate high-frequency current source such as a generator 17. The dimensional aspects of the inductor 10 may be varied without departing from the scope of the present invention and, as disclosed in the preferred embodiment, the central portion of the inductor may be hollow to provide a passage 18 which accommodates the flow of a cooling fluid to dissipate the heat generated by the operation of the inductor.

The inductor 10 encircles an axially progressing longitudinally split pipe 20 having converging edges 22, 24 which terminate at a welding point 26 to define a generally wedge-shaped split 28. The welding point 26 is the point at which the edges 22, 24 are brought into abutting relationship by pressure from conventional rolls 30, 32. The area behind the welding point 26 has been welded to produce a continuous seam 33; therefore, this area no longer requires the heating effect created by the current induced into the pipe.

In operation of the welding apparatus A, the pipe 20 is passed through the inductor 10 and has its edges 22, 24 pressed together beyond the exit end of the inductor. Generator 17 introduces a high-frequency current into the inductor 10, which in turn induces current $x$ into the advancing pipe 20. Because of the low impedance near the edges 22, 24, the high-frequency current induced into the pipe travels along the edges and across the welding point 26 to generate sufficient heat along the edges and at the welding point to progressively join the converging edges. To produce the desired heat at the welding point, a substantial portion of the high-frequency current induced into the pipe should pass across the welding point and not in the parallel path across previously welded seam 33. Also, the high-frequency current $x$ should be concentrated along the edges 22, 24 to preheat these edges before they converge at the welding point 26. The general path of this current tends to spread out which reduces the current density along edges 22, 24 and across welding point 26.

The present invention is directed to a relatively simplified means for concentrating the current $x$ along the edges and across the welding point and the means comprises a generally wedge-shaped flux concentrating insert 40 extending under and spaced from the body 12 of the inductor, and extending into the split 28 and between the edges 22, 24 so that its longitudinally extending edges 42, 44 which converge at a tip 46 are closely spaced from the converging edges 22, 24 of the pipe 20. By appropriate dimensioning of the insert 40, the respective edges of the insert may be close to the corresponding edges of the pipe 20; however, the insert should not come in direct contact with the advancing pipe or the inductor 10. To prevent contact of the insert with the pipe 20, it is contemplated to use insulating means between the insert and edges 22, 24. Various changes in the shape of the insert may be made without departing from the spirit and scope of the invention so long as the insert extends downwardly into split 28 and between the converging edges of the pipe. The insert 40 is composed of a high electrical conductive non-magnetic material such as copper. For dissipating the heat generated within the insert 40 during the welding operation, an appropriate cooling means shown for illustrative purposes as a tubular member 48 affixed to the undersurface of the insert and extending downwardly. It is appreciated that the particular structure of the cooling means is not to limit the present invention. The insert is supported under inductor 10 in split 28 by bracket bolts 49 which are used for illustrative purposes.

In operation, the high-frequency current $x$ induced into pipe 20 induces a corresponding current $y$ in the current concentrating insert 40 whereby the current $y$ flows in an opposite direction to the inducing current $x$. Because of the high-frequency of the current $y$ and because of the proximity effect, the current $y$ passes along the outer periphery of insert 40. The presence of the high electrical conductive insert 40 near only the inner surface of edges 22, 24 causes the current $x$ to flow in a path more closely to the outer portion of these edges than would be the case if the insert were removed or spaced above the edge. The same phenomena takes place at the welding point 26; that is, the current $x$ tends to be more nearly concentrated near tip 46 of the current concentrating insert 40 so that a greater portion of the current actually passes across the engaged portions of edges 22, 24. Another beneficial aspect of extending the current concentrating insert into split 28 is disclosed in FIG. 3 wherein the heating pattern caused by the current concentrating insert 40 is disclosed in detail at 50. The high-frequency current $y$ induced into insert 40 is concentrated in the peripheral portion indicated by dotted line 52 which is adjacent edge 42 of the insert and directly opposite the edge 22 of the pipe. Therefore, the high-frequency inducing current $x$ in the pipe tends to flow along the complete thickness of the pipe to produce a more nearly uniform heat pattern along the complete surface of the edge 22. If the highly conductive insert were positioned above split 28 and over the edges 22, 24, the current $x$ would tend to flow along the upper portion of the edge 22 and would not produce as uniform a heating pattern because the temperature of the lower portion of edge 22 would be raised by conduction of the heat created in the upper portion. In FIG. 4 there is shown a modification wherein the insert 100 is provided with flanges 102, 104 which extend over the edges 22, 24. Thus, the heating pattern 106 is flared out more at the upper and lower surface of the pipe 20 than pattern 50 shown in FIG. 3.

A structural embodiment of the present invention has been illustrated and described in detail; however, it is appreciated that various structural changes may be made without departing from the spirit and scope of the present invention. It is within the contemplation of the present invention to induce the high-frequency current $x$ into the workpiece or pipe 20 by other means such as electrical brushes on opposite sides of the welding point.

Having thus described my invention, I claim:

1. An apparatus adapted to continuously seam weld a pipe having spaced longitudinal edges converging into a welding point and defining a split, said apparatus comprised of a means for advancing the pipe along a predetermined path, means for moving the edges into abutting engagement at the welding point, a power means for causing a high-frequency current to flow along the edges and across the welding point, the improvement comprising: a means for concentrating the high-frequency current along the edges and across the welding point, said means comprising a high electrical conductivity insert electrically isolated from said power means and extending into said split and between said edges.

2. In the improvement as defined in claim 1 wherein said insert extends into said split at least the thickness of the wall of said pipe.

3. The improvement as defined in claim 1 wherein said insert is comprised of an outer periphery, said periphery closely spaced from said edges and said welding point.

4. The improvement as defined in claim 1 wherein said power means comprises a C-shaped inductor, said inductor encircling said pipe and spaced from said welding point toward said split.

5. In an inductor adapted to continuously induction weld a pipe having spaced longitudinal edges converging into a welding point and defining a split, said inductor comprised of a C-shaped conductor encircling said pipe and spaced therefrom, a power source for introducing a high-frequency current into said conductor, said conductor spaced from said welding point toward said split and adapted to induce a high-frequency current into said pipe, the improvement comprising: a means for concentrating the high-frequency induced welding current of the pipe along the edges and across the welding point of the pipe, said means comprising a high electrical conductivity insert electrically isolated from said conductor extending into said split and between said edges.

6. The improvement as defined in claim 5 wherein said insert extends into said split at least the thickness of the wall of said pipe.

7. An inductor adapted to continuously induction weld a pipe having spaced longitudinal edges converging into a welding point and defining a split, said inductor comprised of a C-shaped conductor encircling said pipe and spaced therefrom, a power source for introducing a high-frequency current into said conductor, said conductor spaced from said welding point toward said split and adapted to induce a high-frequency current into said pipe and a means for increasing the current density of the high-frequency induced current across said welding point, said means comprising a high electrical conductivity insert electrically isolated from said conductor and extending radially downwardly into said split at least the thickness of the wall of said pipe, said insert closely spaced from said edges and said welding point.

8. In a continuous seam welding apparatus comprised of a means for advancing a longitudinally split pipe having normally spaced edges, a pressure means for moving said edges into engagement at a welding point, an inductor means spaced from said welding point and away from said pressure means for inducing a current into said pipe to flow along said edges and across said welding point, the improvement comprising: a means for concentrating said current along said edges and across said welding point, said means comprising a high electrical conductivity non-magnetic insert electrically isolated from said inductor means and extending toward said welding point, said insert in line with and extending between said edges, and said insert being closely spaced from said edges and said welding point.

References Cited in the file of this patent
UNITED STATES PATENTS

| | | |
|---|---|---|
| 2,066,668 | Bennett | Jan. 5, 1937 |
| 2,800,561 | Shenk | July 23, 1957 |